(12) United States Patent
Hartmann et al.

(10) Patent No.: US 9,033,834 B2
(45) Date of Patent: May 19, 2015

(54) SECONDARY ASSEMBLY DRIVE OF AN INTERNAL COMBUSTION ENGINE AND METHOD FOR OPERATING SAME

(75) Inventors: Bernd Hartmann, Weisendorf (DE); Hermann Stief, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 168 days.

(21) Appl. No.: 13/992,405

(22) PCT Filed: Sep. 30, 2011

(86) PCT No.: PCT/EP2011/067065
§ 371 (c)(1),
(2), (4) Date: Jun. 7, 2013

(87) PCT Pub. No.: WO2012/079796
PCT Pub. Date: Jun. 21, 2012

(65) Prior Publication Data
US 2013/0274043 A1    Oct. 17, 2013

(30) Foreign Application Priority Data

Dec. 15, 2010    (DE) .......................... 10 2010 054 629

(51) Int. Cl.
*F16H 7/00*    (2006.01)
*F02B 67/06*    (2006.01)
(Continued)

(52) U.S. Cl.
CPC    *F02B 67/06* (2013.01); *F16H 7/02* (2013.01); *B60K 2025/005* (2013.01); *B60K 2025/022* (2013.01); *B60H 1/004* (2013.01); *B60H 1/3222* (2013.01)

(58) Field of Classification Search
CPC ........ F02B 67/06; F02B 2275/06; F16H 7/02; F16H 2007/0874; F16H 7/023
USPC ................................................ 474/84, 86, 87
See application file for complete search history.

(56) References Cited

U.S. PATENT DOCUMENTS

| 2003/0176249 A1* | 9/2003 | Polster et al. .................. 474/134 |
| 2004/0261753 A1* | 12/2004 | Garabello et al. ............. 123/198 |

(Continued)

FOREIGN PATENT DOCUMENTS

| DE | 10001436 | 8/2000 |
| DE | 102008023834 | 1/2009 |

(Continued)

*Primary Examiner* — Henry Liu
(74) *Attorney, Agent, or Firm* — Volpe and Koenig, P.C.

(57) ABSTRACT

A secondary assembly drive of an internal combustion engine and a method for operating same are provided. The secondary assembly drive includes: a first drive wheel (1) which can be rotatably connected to a crank shaft (CR) of the internal combustion engine, an electric machine which can be operated either as a generator (AL) of as a motor (M) and a second drive wheel (2) which can be rotatably connected to the electric machine (AL, M), an air-conditioning compressor (A/C) and a third drive wheel (3) which can be rotatably connected to the air-conditioning compressor, a traction element (4) which rotates infinitely and which wraps around the drive wheels, and an actuable clutch (7) for disconnecting the drive of the electric machine and of the air-conditioning compressor from the crankshaft when necessary. In addition, the air-conditioning compressor is designed for operation in both rotational directions, and a reversal of the rotational direction between the generator operating mode and the motor operating mode of the electric machine is provided.

5 Claims, 1 Drawing Sheet

(51) Int. Cl.
F16H 7/02 (2006.01)
B60H 1/00 (2006.01)
B60H 1/32 (2006.01)
B60K 25/00 (2006.01)
B60K 25/02 (2006.01)

(56) References Cited

U.S. PATENT DOCUMENTS

2009/0013952 A1* 1/2009 Deniston et al. ......... 123/179.28
2009/0255741 A1* 10/2009 Major et al. ............... 180/65.22
2010/0145573 A1* 6/2010 Vasilescu ........................ 701/36

FOREIGN PATENT DOCUMENTS

| GB | 2199917 | 7/1988 |
| WO | 0210615 | 2/2002 |
| WO | 0229281 | 4/2002 |

\* cited by examiner

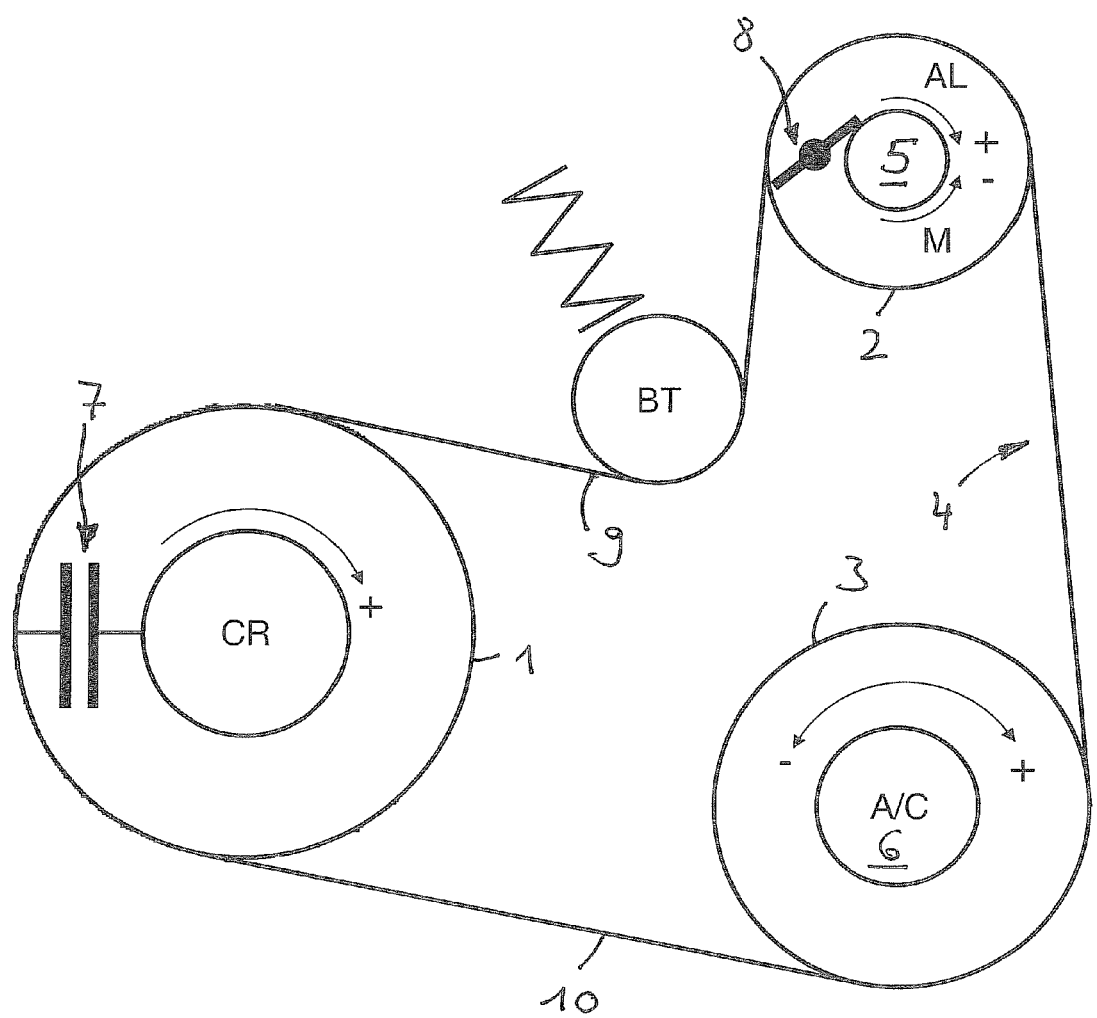

SECONDARY ASSEMBLY DRIVE OF AN INTERNAL COMBUSTION ENGINE AND METHOD FOR OPERATING SAME

BACKGROUND

The invention relates to a secondary assembly drive of an internal combustion engine and to a method for operating this drive. The secondary assembly drive comprises:

- a first drive that can be rotationally connected to a crankshaft of the internal combustion engine,
- an electric machine that can be operated selectively as a generator or as a motor and a second drive wheel that can be rotationally connected to the electric machine,
- an air-conditioning system compressor and a third drive wheel that can be rotationally connected to the air-conditioning system compressor,
- an endlessly rotating traction mechanism that wraps around the drive wheels,
- and a controllable coupling for the drive disconnection of the electric machine and the air-conditioning system compressor from the crankshaft when necessary.

A belt drive according to the class for secondary assembly drives of internal combustion engines emerges from DE 10 2008 023 834 A1. Switchable couplings are provided both between the crankshaft and the associated crankshaft belt pulley and also between each of the ancillary drives and the associated drive pulley. These form the basis for a series of additional functionalities for the ancillary drive, in that the ancillary drives are driven selectively by the crankshaft or by the electric machine formed as a starter generator or also not at all. Thus, the starter generator allows, as additional functionalities, not only a starting of the belt of the internal combustion engine, but also air conditioning for the vehicle when the internal combustion engine is stopped. When providing air conditioning when the vehicle is parked, the (stopped) crankshaft is separated from the drive of the belt drive and the air-conditioning system compressor is driven electromotively. An analogous operation is applicable here for the coolant pump.

When the internal combustion engine is running, the crankshaft-side coupling is opened so that the entire ancillary drive is separated from the drive of the crankshaft and stopped accordingly.

SUMMARY

The invention is based on the objective of providing an ancillary drive having additional functionalities of the type named above with a structurally very simple design and a method for operating such an ancillary drive.

The solution to meet this objective is given, in terms of the device and in terms of the method, according to the invention. Consequently, on one hand, the air-conditioning system compressor should be formed for compressor operation in both rotational directions and, on the other hand, a reversal of the rotational direction between the generator mode and the motor mode of the electric machine should be provided. The ancillary drive according to the invention can be operated in at least three states, wherein, in principle, only one controllable coupling is required between the crankshaft-side first drive wheel and the crankshaft. Additional couplings on the side of the electric machine and the air-conditioning system compressor are optional.

The three operating modes are:
a) (conventional) driving the ancillary drive by the crankshaft
b) switching off the ancillary drive
c) providing air conditioning when the vehicle is parked.

In a preferred construction of the invention, a freewheel coupling can be arranged between the electric machine and the second drive wheel and this freewheel coupling allows, in the rotational direction of the generator mode, the electric machine to be taken over relative to the second drive wheel. Such a freewheel coupling—frequently also called alternator or generator freewheel in conventional ancillary drives—is an efficient means, as is known, for dynamically decoupling the relatively large rotating generator mass from the rotational oscillations of the crankshaft and reducing the load on the drive. In connection with the invention, the freewheel coupling can also be used without additional means for the decoupling of the electric machine, because this drives the ancillary drive in the opposite rotational direction by means of the blocked freewheel coupling to provide air conditioning when the vehicle is parked. As an alternative decoupling arrangement, a rotating, spring-mounted arrangement of the second drive wheel on the electric machine is also conceivable, wherein this arrangement is also provided with end stops.

In another preferred construction of the invention, in the area of the slack section that runs between the first drive wheel (on the side of the crankshaft) and the second drive wheel (on the side of the electric machine), a tensioning device should be arranged for pre-tensioning the traction mechanism. Due to the reversal in the rotational direction of the ancillary drive driven by the electric machine to provide air conditioning when the vehicle is parked, the tensioning device is always, i.e., in all three operating modes, in the slack section, so that the pre-tensioning of the taut section can also be adjusted by means of a conventional tensioning device in connection with the invention without additional means.

A belt is advantageously provided as the traction mechanism. Nevertheless, an ancillary drive according to the invention can also be a chain drive.

The ancillary drive is arranged with the mentioned additional functionalities in a single traction mechanism plane. Additional ancillary drives and/or additional functionalities can likewise be provided in the same traction mechanism plane or in a different traction mechanism plane. This relates, in particular, to a coolant pump for cooling the internal combustion engine that is likewise formed for a pumping mode in both operating rotational directions. According to the construction of the coolant pump, its change in rotational direction does indeed lead to a switching of the suction and pressure sides, but can be accompanied by different, high pumping rates. Analogous to the mode providing air conditioning when the vehicle is parked or cooling of the vehicle interior, coolant that is heated during operation and is circulated when the internal combustion engine is stopped is used for heating the vehicle interior (heating when the vehicle is parked).

BRIEF DESCRIPTION OF THE DRAWING

Additional features of the invention are also given from the following description and from the drawing that shows schematically an ancillary drive according to the invention for a motor vehicle internal combustion engine.

The ancillary drive according to the invention is a belt drive with a poly-V belt 4 as an endlessly rotating traction mechanism, with a first drive wheel 1 that is arranged on the crankshaft designated with CR in the internal combustion engine, with an electric machine that is designated with AL and M, with a second drive wheel 2 that is arranged on the generator shaft 5 of this electric machine, with an air-conditioning system compressor that is designated with A/C, with a third drive wheel 3 that is arranged on the compressor shaft 6, and with a tensioning device that is designated with BT for pre-tensioning the belt 4.

DETAILED DESCRIPTION OF THE PREFERRED EMBODIMENT

The operating rotational direction of the crankshaft CR corresponds to the rotational direction drawn with a plus sign. The first drive wheel 1 can be rotationally connected to the crankshaft CR by means of an electrically controllable magnetic coupling 7 shown with a symbol (this can either be open in the de-energized state or closed in the de-energized state). In the open state, the magnetic coupling 7 is used for the drive disconnection of the crankshaft CR from the electric machine AL, M and the air-conditioning system compressor A/C when necessary.

The electric machine can be operated, first, as a generator AL in the rotational direction drawn with a plus sign and, second, as a motor M in the opposite rotational direction accordingly drawn with a minus sign. The second drive wheel 2 can be rotationally connected to the generator shaft 5 of the electric machine AL, M by means of a freewheel coupling 8 shown with a symbol in the form of a conventional generator freewheel. The freewheel coupling 8 is configured so that it allows the generator shaft 5 to be overtaken in the generator rotational direction drawn with a plus sign and blocked in the opposite motor rotational direction drawn with a minus sign.

The air-conditioning system compressor A/C involves a wobble-plate compressor that is used in the refrigerant circuit of the vehicle air-conditioning system independent of rotational direction according to the shown rotational directions. In other words, the air-conditioning system compressor causes a compression of the refrigerant in both operating rotational directions without changing the suction and pressure side. The third drive wheel 3 is either rotationally connected permanently to the compressor shaft 6 or can be rotationally connected to the compressor shaft by means of a controllable magnetic coupling in an optional, not-shown variant.

The tensioning device BT is a conventional spring-loaded belt tensioner that pre-tensions the belt 4 in the slack section 9 between the first drive wheel 1 and the second drive wheel 2. According to the invention, there is no change between the slack section 9 and the taut section 10, which is disadvantageous for the operation of the belt tensioner BT, because, first, the electric machine operated as a generator AL is driven by the crankshaft CR in the positive rotational direction and, second, the electric machine operated as a motor M drives the air-conditioning system compressor A/C in the opposite negative rotational direction and consequently the positions of the taut section 10 and the slack section remain unchanged.

The three operating states already mentioned above for the ancillary drive are as follows:
a) (conventional) driving the ancillary drive by the crankshaft CR:
  the internal combustion engine is in operation,
  the magnetic coupling 7 is closed,
  the electric machine is in generator mode AL,
  the drive of the generator AL and the air-conditioning system compressor A/C is performed by the crankshaft CR in its (positive) rotational direction by means of the second drive wheel 2 for a blocked freewheel coupling 8 and/or by means of the third drive wheel 3,
  the freewheel coupling 8 allows the generator shaft 5 to be taken over relative to the second drive wheel 2/the crankshaft CR.
b) switching off the ancillary drive:
  the internal combustion engine is in operation,
  the magnetic coupling 7 is opened to the rotating crankshaft CR,
  the electric machine AL, M and the air-conditioning system compressor A/C are stopped.
c) air conditioning while the vehicle is parked:
  the internal combustion engine is stopped,
  the magnetic coupling 7 is opened to the stopped crankshaft CR,
  the electric machine is in motor mode M and rotates in the opposite rotational direction (relative to the generator mode AL),
  the air-conditioning system compressor AL is driven by the electric machine in the opposite rotational direction for a blocked freewheel coupling 8 by means of the third drive wheel 3.

The not-shown operating mode of "heating while the vehicle is parked," which is mentioned above and in which a coolant pump that is not dependent on the rotational direction is also connected in the ancillary drive, corresponds, in terms of the drive arrangement, to the mode c) air conditioning while the vehicle is parked.

LIST OF REFERENCE NUMBERS

1 First drive wheel
2 Second drive wheel
3 Third drive wheel
4 Belt/traction mechanism
5 Generator shaft
6 Compressor shaft
7 Magnetic coupling
8 Freewheel coupling
9 Slack section
10 Taut section
CR Crankshaft
A/C Air-conditioning system compressor
AL Generator
M Motor
BT Belt tensioner/tensioning device

The invention claimed is:
1. Ancillary drive of an internal combustion engine, comprising:
  a first drive wheel that is adapted to be rotationally connected to a crankshaft (CR) of the internal combustion engine,
  an electric machine that is operable selectively as a generator (AL) or as a motor (M) and a second drive wheel (2) that is rotationally connected to the electric machine (AL, M),
  an air-conditioning system compressor (A/C) and a third drive wheel that is rotationally connected to the air-conditioning system compressor,
  an endlessly rotating traction mechanism that wraps around the drive wheels,
  and a controllable coupling for drive disconnection of the electric machine (AL, M) and the air-conditioning system compressor (A/C) from the crankshaft (CR) when necessary,
  the air-conditioning system compressor (A/C) is formed for compressor operation in both rotational directions and a reversal of the rotational direction is provided between a generator mode and a motor mode of the electric machine (AL, M).

2. Ancillary drive according to claim 1, wherein a freewheel coupling is arranged between the electric machine (AL, M) and the second drive wheel and the freewheel coupling allows the electric machine to be taken over relative to the second drive wheel in the rotational direction of the generator mode.

3. Ancillary drive according to claim 1, wherein a tensioning device (BT) for pre-tensioning the traction mechanism is arranged in an area of a slack section running between the first drive wheel and the second drive wheel.

4. Ancillary drive according to claim 1, wherein the ancillary drive also has a coolant pump that is formed for a pumping operation in both rotational directions.

5. Method for operating an ancillary drive of an internal combustion engine, comprising:
- a first drive wheel that is adapted to be rotationally connected to a crankshaft (CR) of the internal combustion engine,
- an electric machine that is operable selectively as a generator (AL) or as a motor (M) and a second drive wheel that is rotationally connected to the electric machine (AL, M),
- an air-conditioning system compressor (A/C) that is operable independent of a rotational direction and a third drive wheel that is rotationally connected to the air-conditioning compressor,
- an endlessly rotating traction mechanism that wraps around the drive wheels,
- and a controllable coupling for drive disconnection of the electric machine (AL, M) and the air-conditioning system compressor (A/C) from the crankshaft (CR) when necessary,
- wherein, during a generator mode, the coupling is closed and the crankshaft (CR) drives the electric machine (AL) and the third drive wheel in one rotational direction, and wherein, during a motor mode, the coupling is open and the electric machine (M) drives the third drive wheel in an opposite rotational direction.

* * * * *